(12) United States Patent
Futagami et al.

(10) Patent No.: US 7,026,753 B2
(45) Date of Patent: Apr. 11, 2006

(54) GLASS FOR FLUORESCENT LAMP, GLASS TUBE FOR FLUORESCENT LAMP, AND FLUORESCENT LAMP

(75) Inventors: Tsutomu Futagami, Shiga (JP); Yukio Takagi, Shiga (JP)

(73) Assignee: Nippon Electric Glass Co., Ltd., Shiga (JP)

( * ) Notice: Subject to any disclaimer, the term of this patent is extended or adjusted under 35 U.S.C. 154(b) by 0 days.

(21) Appl. No.: 09/983,967

(22) Filed: Oct. 26, 2001

(65) Prior Publication Data

US 2002/0074930 A1    Jun. 20, 2002

(30) Foreign Application Priority Data

Oct. 26, 2000    (JP) ................. P.2000-326564

(51) Int. Cl.
*H01J 5/02* (2006.01)
*C03C 3/085* (2006.01)
*C03C 3/087* (2006.01)

(52) U.S. Cl. .............. 313/493; 313/636; 501/70; 501/69

(58) Field of Classification Search .......... 501/66, 501/68, 69, 70, 72, 64; 313/480, 493, 477 R, 313/636

See application file for complete search history.

(56) References Cited

U.S. PATENT DOCUMENTS

| 4,684,847 | A | 8/1987 | Spierings et al. |
| 5,350,972 | A | 9/1994 | Bucher et al. |
| 5,470,805 | A | 11/1995 | Filmer |
| 5,525,553 | A * | 6/1996 | Brocheton et al. ........... 501/64 |
| 5,883,030 | A | 3/1999 | Bako et al. |
| 5,925,582 | A * | 7/1999 | Filmer et al. ................ 501/69 |
| 5,977,001 | A * | 11/1999 | Suha et al. .................. 501/66 |
| 6,528,444 | B1 * | 3/2003 | Kondoh et al. .............. 501/70 |
| 2002/0068678 | A1 * | 6/2002 | Seto et al. ................... 501/70 |
| 2003/0085647 | A1 * | 5/2003 | Komori et al. ......... 313/477 R |

FOREIGN PATENT DOCUMENTS

| CN | 1039307 C | 7/1998 |
| EP | 0 936 195 | 8/1999 |
| JP | 51-86515 | 7/1976 |
| JP | 52-33124 | 8/1977 |
| JP | 2-263729 | 10/1990 |
| JP | 6-92677 | 4/1994 |
| JP | 2000-290038 | 10/2000 |
| JP | 2002308644 A * | 10/2002 |

* cited by examiner

*Primary Examiner*—Karabi Guharay
(74) *Attorney, Agent, or Firm*—Nixon & Vanderhye P.C.

(57) ABSTRACT

The present invention provides glass for a fluorescent lamp, comprising: $CeO_2$ of 0.1% to 1.0%, $Sb_2O_3$ of 0.05% or lower, $SiO_2$ of 60% to 75%, $Al_2O_3$ of 0.5% to 10%, $B_2O_3$ of 0% to 5%, CaO of 0% to 8%, MgO of 0% to 8%, SrO of 0% to 15%, BaO of 1% to 12%, $R_2O$ of 13% to 22% (R represents Li, Na or K), $Fe_2O_3$ of 0% to 0.2%, $TiO_2$ of 0% to 1.0%, and PbO of 0.05% or lower, the percent each being by mass; a glass tube for a fluorescent lamp comprises the above glass; and a fluorescent lamp comprises the above glass tube as an envelope.

6 Claims, 1 Drawing Sheet

FIGURE
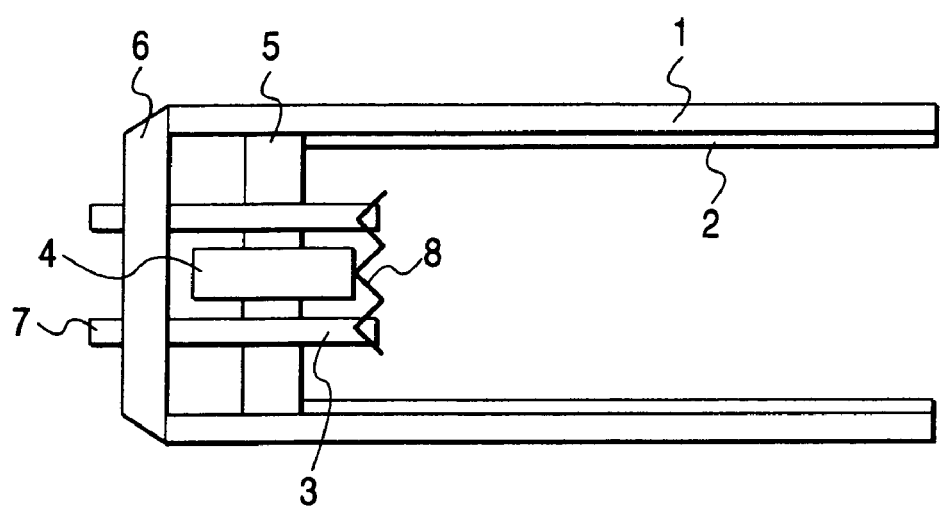

GLASS FOR FLUORESCENT LAMP, GLASS TUBE FOR FLUORESCENT LAMP, AND FLUORESCENT LAMP

FIELD OF THE INVENTION

The present invention relates to glass for a fluorescent lamp, and a glass tube for a fluorescent lamp and a fluorescent lamp each prepared from the glass for a fluorescent lamp.

BACKGROUND OF THE INVENTION

Generally, in a fluorescent lamp, ultraviolet rays caused by arc discharge are irradiated on a fluorescent material coated on the inner wall of a glass tube, and visible light caused by the fluorescent powder is used.

Also, glass used in the fluorescent lamp can be roughly divided into two parts, i.e., a cylindrical bulb part and a stem part. The bulb part is normally in the form of a straight tube or a circular tube obtained by heat-forming the straight tube. In recent years, for the purpose of enhancing the lamp efficiency or downsizing the lamp, fluorescent lamps having a complicated shape such as a U tube and a twin tube having two U tubes connected to each other have been developed.

At first, the glass tube to be used as the envelope for these fluorescent lamps having a circular or complicated shape had been formed by lead glass containing Pbo in an amount as relatively large as about 20 to 30% to facilitate working. At present, however, the lead glass is replaced by soda-lime glass to avoid the toxicity problem of PbO. The soda-lime glass for this purpose contains BaO as a component for lowering its viscosity so as to have workability close to the PbO-containing glass or contains $Sb_2O_3$ so as to maintain a high luminance required for fluorescent lamps.

However, the soda-lime glass containing BaO or $Sb_2O_3$ is disadvantageous in that since it has a high ultraviolet transparency, ultraviolet rays irradiated from the light source during lighting pass through the glass, giving adverse effects on human being or causing discoloration or deterioration of a resin constituting the lamp fixture.

In order to lower the ultraviolet transparency of glass for reducing the leakage of ultraviolet rays, $CeO_2$ can be incorporated in the glass. However, when the glass containing $CeO_2$, solarization, i.e., coloring of the glass by ultraviolet rays, is caused and hence the transmittance of the glass is lowered so that the luminance of the lamp is deteriorated.

SUMMARY OF THE INVENTION

An object of the present invention is to provide glass for a fluorescent lamp which is hardly subject to solarization and has a high capability of shielding ultraviolet rays.

Another object of the present invention is to provide a glass tube for a fluorescent lamp and a fluorescent lamp each prepared from the glass for a fluorescent lamp.

These and other object of the present invention have been accomplished by glass for a fluorescent lamp, comprising:
  $CeO_2$ in an amount of from 0.1% to 1.0% by mass;
  $Sb_2O_3$ in an amount of 0.05% or lower by mass;
  $SiO_2$ in an amount of from 60% to 75% by mass;
  $Al_2O_3$ in an amount of from 0.5% to 10% by mass;
  $B_2O_3$ in an amount of from 0% to 5% by mass;
  CaO in an amount of from 0% to 8% by mass;
  MgO in an amount of from 0% to 8% by mass:
  SrO in an amount of from 0% to 15% by mass;
  BaO in an amount of from 1% to 12% by mass;
  $R_2O$ in an amount of from 13% to 22% by mass, wherein R represents Li, Na or K;
  $Fe_2O_3$ in an amount of from 0% to 0.2% by mass;
  $TiO_2$ in an amount of from 0% to 1.0% by mass; and
  PbO in an amount of 0.05% or lower by mass.

Furthermore, these and other objects of the present invention have been accomplished by a glass tube for a fluorescent lamp comprises the above glass.

Moreover, these and other objects of the present invention have been accomplished by a fluorescent lamp comprises the above glass tube as an envelope.

DETAILED DESCRIPTION OF THE INVENTION

As a result that the inventors made extensive studies, they found that the above objects of the invention can be accomplished by restricting the amount of $Sb_2O_3$ to a predetermined amount or lower while incorporating $CeO_2$ in glass for a fluorescent lamp as an essential component from the knowledge that the solarization of $CeO_2$-containing glass is attributed to the presence of Sb ions in the glass that changes the valence of Ce ions in the glass. The present invention has thus been completed.

Unless otherwise indicated, the term "%" hereinafter means "% by mass" based on the total amount of the glass.

The expression "an amount of from 0% to X %" in component Y of the glass means that component Y is either not present, or is higher than 0% and X % or lower.

The glass for a fluorescent lamp according to the invention comprises $CeO_2$ in an amount of 0.1% or higher to thereby lower the ultraviolet transmittance and hence improve the capability of shielding ultraviolet rays. Also, since the amount of $Sb_2O_3$ in the glass for a fluorescent lamp according to the invention is strictly restricted to 0.05% or less, solarization is inhibited.

The reason why the various components of the glass for a fluorescent lamp of the invention are as follows.

$CeO_2$ is added as an essential component to lower the transparency of the glass in the ultraviolet range without lowering the transparency in the visible light range. When the amount of $CeO_2$ is lower than 0.1%, the desired effect cannot be obtained. On the other hand, when the amount of $CeO_2$ exceeds 1%, the glass is yellowed so that the transmittance in the visible light range is lowered, making it impossible to provide a high luminance lamp. The amount of $CeO_2$ is preferably from 0.1% to 0.8%, more preferably from 0.15% to 0.8%.

$Sb_2O_3$ is used as a clarifier. However, when used in combination with $CeO_2$, solarization is caused so that the glass is colored and the luminance is lowered. Therefore, it is important to restrict the amount of $Sb_2O_3$ to 0.05% or lower. Preferably, $Sb_2O_3$ is not added.

$SiO_2$ is a glass network former. When the amount of $SiO_2$ is lower than 60%, the thermal expansion coefficient becomes too large so that it is difficult to fit the glass with a stem and the water resistance of the glass is lowered. On the other hand, when the amount of $SiO_2$ exceeds 75%, the resulting glass has a deteriorated meltability or an increased viscosity so that the workability of glass during the preparation of a lamp glass is lowered. The amount of $SiO_2$ is preferably from 62% to 74%, more preferably from 63% to 73%.

$Al_2O_3$ is a component which enhances the weather resistance and devitrification of glass. When the amount of $Al_2O_3$ is lower than 0.5%, these effects cannot be obtained. On the other hand, when the amount of $Al_2O_3$ exceeds 10%, the resulting glass has a deteriorated meltability. The amount of $Al_2O_3$ is preferably from 0.5% to 5%, more preferably from 1% to 3.2%.

$B_2O_3$ is a component which enhances the meltability and water resistance of glass. When the amount of $B_2O_3$ exceeds 5%, the amount of volatile substances is increased during melting of glass so that it is difficult to obtain homogeneous glass. The amount of $B_2O_3$ is preferably from 0% to 3%, more preferably from 0% to 2.5%.

CaO is a component which enhances the meltability of glass and the workability of glass during the preparation of a lamp. When the amount of CaO exceeds 8%, the resulting glass is liable to be devitrified so that the workability is deteriorated. The amount of CaO is preferably from 0% to 5%, more preferably from 0% to 4.5%.

MgO is a component which enhances the meltability of glass and the workability of glass during the preparation of a lamp similar to CaO. When the amount of MgO exceeds 8%, the resulting glass has a deteriorated chemical resistance. The amount of MgO is preferably from 0% to 5%, more preferably from 0% to 4.5%.

SrO is a component which enhances the meltability of glass and the workability of glass during the preparation of a lamp. When the amount of SrO exceeds 15%, the resulting glass is liable to be devitrified and the workability is deteriorated. The amount of SrO is preferably from 0% to 10%, more preferably from 0% to 8%.

BaO is a component which enhances the meltability of glass and the workability of glass during the preparation of a lamp. When the amount of BaO is lower than 1%, the above effects cannot be obtained. On the other hand, when the amount of BaO exceeds 12%, the resulting glass is liable to be devitrified and the workability is deteriorated. The amount of BaO is preferably from 1% to 11%, more preferably from 1% to 9%.

$R_2O$ (in which R represents total amount of Li, Na or K) is an essential component which adjusts the thermal expansion coefficient of glass to a range of from 90 to $105 \times 10^{-7}/°$C. to thereby fit the glass with the stem and lowers the viscosity of glass. When the amount of $R_2O$ is lower than 13%, these effects cannot be sufficiently obtained. On the other hand, when the amount of $R_2O$ exceeds 22%, the thermal expansion coefficient of the glass becomes too large. Furthermore, alkaline components are liable to be eluted so that they react with a fluorescent material or mercury to lower the luminance of the fluorescent lamp or the weather resistance is lowered. The amount of $R_2O$ is preferably from 13% to 20%, more preferably from 14% to 20%. Moreover, the amounts of $Li_2O$, $Na_2O$ and $K_2O$ are preferably from 0% to 5%, from 3% to 15% and from 1% to 11%, more preferably from 0% to 4%, from 5% to 12% and from 3% to 10%, respectively.

$Fe_2O_3$ is a component which lowers the transmittance of glass in the ultraviolet range. When the amount of $Fe_2O_3$ exceeds 0.2%, the resulting glass is colored to thereby lower its transparency in the visible light range so that a high luminance lamp cannot be obtained. The amount of $Fe_2O_3$ is preferably from 0.01% to 0.1%.

$TiO_2$ is a component which inhibits solarization as well as a component which lowers the transparency of glass in the visible light range. Therefore, the amount of $TiO_2$ is limited to be 1.0% or lower. The amount of $TiO_2$ is preferably from 0% to 0.8%, more preferably from 0% to less than 0.5%.

PbO is a component which lowers the viscosity of glass to thereby improve the workability of glass during the preparation of a lamp. However, since it is a harmful component, it is important to restrict the amount of PbO to 0.05% or lower. Preferably, PbO is not added.

Besides the above components, $SO_3$, Cl and F may be added as refining agents each in an amount of 0.5% or lower. In order to inhibit solarization, it is preferred that $Sb_2O_3$ be replaced by these refining agents. Also, $As_2O_3$ has a refining effect but is preferably not used because of its environmental problems.

A process for the preparation of a glass tube for a fluorescent lamp and a fluorescent lamp each using the glass for a fluorescent lamp of the invention will be described hereinafter.

A raw material having a desired formulation is incorporated in a glass melting furnace and melted at a temperature of from 1,500° C. to 1,600° C. for vitrification. The melted glass material is formed into a cylinder using a known tube drawing method, such as Danner method, down draw method and the like, and then cut into a tube having a desired length.

Subsequently, the glass tube for a fluorescent lamp thus obtained is constricted on the both ends thereof, and then heat-formed into a circular form, U form or the like. Thus, an envelope for a fluorescent lamp is prepared.

Thereafter, coating of a fluorescent powder, attachment of a stem, evacuation, enclosure of mercury or Ar gas, etc. are carried out to obtain a fluorescent lamp.

A fluorescent lamp using the glass of the present invention can be prepared in the ordinary method and in the ordinary structure. An example of the fluorescent lamp is shown in the attached figure. The fluorescent lamp can be prepared, for example, by coating a fluorescent powder 2 is coated on the inside of a tube-formed glass bulb 1, then the tube is hermetically sealed with a stem glass 5 having a exhaust glass tube and a electrode lead wire 3 having a filament 8. Then air in the tube was exhausted, and mercury and rare gas such as argon is enclosed, and then the exhaust glass tube 4 is hermetically sealed. A pipe sleeve 6 having a terminal pin 7 is fixed on the both end of the tube, and the electrode lead wire 3 is connected with the terminal pin 7.

The glass for a fluorescent lamp according to the invention comprises $CeO_2$ in an amount of 0.1% or lower to have an enhanced capability of shielding ultraviolet rays. Also, since the $Sb_2O_3$ amount is strictly restricted to 0.05% or lower, solarization can be inhibited.

Furthermore, the glass tube for a fluorescent lamp according to the invention can easily be molded and thus can be used as an envelope for a fluorescent lamp having a circular or complicated shape as well as a straight form.

Moreover, the fluorescent lamp according to the invention comprises a glass having the above properties and thus can provide a lamp having a small ultraviolet leakage, a high luminance and a low deterioration of luminance.

The present invention will be further described in the following examples, but the present invention should not be construed as being limited thereto.

Tables 1 to 3 show examples (Sample Nos. 1 to 8) and comparative examples (Sample Nos. 9 to 12) of the glass for a fluorescent lamp according to the invention. Sample No. 12 shows a conventional glass for a fluorescent lamp made of soda-lime glass.

TABLE 1

| Formulation (% by mass) | Example | | | |
|---|---|---|---|---|
| | No. 1 | No. 2 | No. 3 | No. 4 |
| $SiO_2$ | 68.90 | 67.70 | 68.75 | 68.30 |
| $Al_2O_3$ | 2.00 | 3.20 | 2.00 | 2.00 |
| $B_2O_3$ | — | — | — | — |
| CaO | 3.80 | 1.90 | 3.80 | 3.80 |
| MgO | 2.00 | 1.30 | 2.00 | 2.00 |
| SrO | 5.60 | 3.10 | 5.60 | 5.60 |
| BaO | 3.00 | 9.00 | 3.00 | 3.00 |
| $Li_2O$ | 1.60 | 1.30 | 1.60 | 1.60 |
| $Na_2O$ | 8.00 | 7.40 | 8.00 | 8.00 |
| $K_2O$ | 4.90 | 5.00 | 4.90 | 4.90 |
| $TiO_2$ | — | — | — | — |
| $Fe_2O_3$ | — | — | — | — |
| $SO_3$ | — | — | — | — |
| $CeO_2$ | 0.20 | 0.10 | 0.30 | 0.80 |
| $Sb_2O_3$ | — | — | 0.05 | — |
| Thermal expansion coefficient (30–380° C.) ($\times 10^{-7}$/° C.) | 94.5 | 96.5 | 94.5 | 94.5 |
| Softening point (° C.) | 667 | 667 | 667 | 667 |
| Solarization resistance $\Delta T$ % | 2.2 | 2.6 | 1.9 | 1.2 |
| Before irradiation with ultraviolet rays $T\%_{400}$ (%) | 91.1 | 91.3 | 90.6 | 90.1 |
| After irradiation with ultraviolet rays $T\%_{400}$ (%) | 88.9 | 88.7 | 88.7 | 88.9 |
| Ultraviolet transmittance (%) | 4.9 | 8.6 | 2.1 | 1.6 |

TABLE 2

| Formulation (% by mass) | Example | | | |
|---|---|---|---|---|
| | No. 5 | No. 6 | No. 7 | No. 8 |
| $SiO_2$ | 68.50 | 68.55 | 68.70 | 72.70 |
| $Al_2O_3$ | 2.00 | 2.00 | 2.00 | 1.70 |
| $B_2O_3$ | — | — | — | 2.30 |
| CaO | 3.80 | 3.80 | 3.80 | — |
| MgO | 2.00 | 2.00 | 2.00 | — |
| SrO | 5.60 | 5.60 | 5.60 | — |
| BaO | 3.00 | 3.00 | 3.00 | 6.00 |
| $Li_2O$ | 1.60 | 1.60 | 1.60 | — |
| $Na_2O$ | 8.00 | 8.00 | 8.00 | 8.20 |
| $K_2O$ | 4.90 | 4.90 | 4.90 | 8.80 |
| $TiO_2$ | 0.10 | — | — | — |
| $Fe_2O_3$ | — | 0.05 | — | — |
| $SO_3$ | — | — | 0.10 | 0.10 |
| $CeO_2$ | 0.50 | 0.50 | 0.30 | 0.20 |
| $Sb_2O_3$ | — | — | — | — |
| Thermal expansion coefficient (30–380° C.) ($\times 10^{-7}$/° C.) | 94.5 | 94.5 | 94.5 | 94.5 |
| Softening point (° C.) | 667 | 667 | 667 | 681 |
| Solarization resistance $\Delta T$ % | 1.7 | 1.8 | 1.8 | 2.1 |
| Before irradiation with ultraviolet rays $T\%_{400}$ (%) | 90.5 | 90.6 | 90.8 | 90.9 |
| After irradiation with ultraviolet rays $T\%_{400}$ (%) | 88.8 | 88.8 | 89.0 | 88.8 |
| Ultraviolet transmittance (%) | 2.1 | 2.2 | 2.3 | 5.0 |

TABLE 3

| Formulation (% by mass) | Comparative Example | | | |
|---|---|---|---|---|
| | No. 9 | No. 10 | No. 11 | No. 12 |
| $SiO_2$ | 68.95 | 68.00 | 68.70 | 70.80 |
| $Al_2O_3$ | 2.00 | 2.00 | 2.00 | 1.90 |
| $B_2O_3$ | — | — | — | 0.90 |
| CaO | 3.80 | 3.80 | 3.80 | 4.60 |
| MgO | 2.00 | 2.00 | 2.00 | 4.00 |
| SrO | 5.60 | 5.60 | 5.60 | — |
| BaO | 3.00 | 3.00 | 3.00 | — |
| $Li_2O$ | 1.60 | 1.60 | 1.60 | — |
| $Na_2O$ | 8.00 | 8.00 | 8.00 | 15.90 |
| $K_2O$ | 4.90 | 4.90 | 4.90 | 1.30 |
| $TiO_2$ | — | — | — | — |
| $Fe_2O_3$ | — | — | — | — |
| $SO_3$ | 0.10 | — | 0.10 | 0.10 |
| $CeO_2$ | 0.05 | 1.10 | 0.20 | — |
| $Sb_2O_3$ | — | — | 0.10 | 0.50 |
| Thermal expansion coefficient (30–380° C.) ($\times 10^{-7}$/° C.) | 94.5 | 94.5 | 94.5 | 98.5 |
| Softening point (° C.) | 667 | 667 | 667 | 695 |
| Solarization resistance $\Delta T$ % | 2.0 | 1.8 | 4.4 | 2.1 |
| Before irradiation with ultraviolet rays $T\%_{400}$ (%) | 90.8 | 86.6 | 90.8 | 90.9 |
| After irradiation with ultraviolet rays $T\%_{400}$ (%) | 88.8 | 84.8 | 86.4 | 88.8 |
| Ultraviolet transmittance (%) | 32.2 | 0.9 | 4.5 | 72.6 |

The samples set forth in Tables above were prepared as follows.

Glass materials having the glass formulation set forth in Tables above were each melted at a temperature of 1,550° C. in a platinum crucible. In order to obtain homogeneous glass, the melted glass was stirred by a platinum agitating blade during this procedure so that it was defoamed. Thereafter, the melted glass was molded into a predetermined shape, followed by cooling gradually.

The thermal expansion coefficient, softening point, solarization resistance and ultraviolet transmittance in the samples thus obtained were each then evaluated.

These properties were measured in the following manners.

For the measurement of the thermal expansion coefficient, a columnar sample having a diameter of 3.5 mm and a length of 50 mm was prepared. The average thermal expansion coefficient was measured using a dilatometer at a temperature range of from 30° C. to 380° C.

The softening point was measured according to ASTM C338. The thermal processing during the preparation of a fluorescent lamp having a circular or complicated shape is conducted based on the softening point. The softening point is preferably low for efficient processing.

For the measurement of solarization resistance, the sample was optically polished on the both sides thereof until the thickness thereof reached 1 mm. The visible light transmittance ($T\%_{400}$) was then measured at a wavelength of 400 nm. Subsequently, the sample was irradiated with ultraviolet rays having a wavelength of 253.7 nm with a 40 W low voltage mercury lamp for 8 hours. Thereafter, the visible light transmittance at a wavelength of 400 nm was measured again to determine the decreased amount of transmittance by the irradiation with ultraviolet rays as $\Delta T$ %. The lower the solarization resistance, the greater the decreased amount of the transmittance, so that and the luminance of the fluorescent lamp is markedly lowered.

For the measurement of ultraviolet transmittance, the sample was optically polished on the both sides thereof until the thickness thereof reached 1 mm. The ultraviolet transmittance at a wavelength of 320 nm was then measured. The lower the ultraviolet transmittance, the smaller the ultraviolet leakage, so that the resin constituting the lamp fixture and the like are hardly discolored and deteriorated.

As is apparent from Tables above, since Sample Nos. 1 to 8 according to the examples of the invention had a $CeO_2$ amount of 0.1% or higher, they showed a ultraviolet transmittance as low as 8.6% or less and hence a high capability of shielding ultraviolet rays. Furthermore, since these samples had an $Sb_2O_3$ amount of 0.05% or lower, they showed ΔT% as low as 2.6% or less and a good solarization resistance. Moreover, since these samples had a thermal expansion coefficient of from 94.5 to $98.5 \times 10^{-7}/°$ C., they showed a good fit with the stem. These samples also had a softening point as low as 681° C. or less. Thus, these samples had more excellent properties than Sample No. 12, which is a conventional product.

On the other hand, since Sample No. 9, which is a comparative example, had a $CeO_2$ amount of 0.05%, it exhibited a ultraviolet transmittance as high as 32.2% and hence a low capability of shielding ultraviolet rays. Since Sample No. 10 had a $CeO_2$ amount of 1.1%, it had $T\%_{400}$ as low as 86.6% and thus was not able to provide a high luminance lamp. Since Sample No. 11 has an $Sb_2O_3$ amount of 0.1%, it had ΔT % as high as 4.4% and hence a deteriorated solarization resistance. Since Sample No. 12 was free of $CeO_2$, it exhibited a ultraviolet transmittance as high as 72.6% and hence a low capability of shielding ultraviolet rays. The softening point, which indicates ease of thermal processing, of the sample was as high as 695° C.

Subsequently, Sample Nos. 2, 7, 8, 9, 11 and 12 were used to prepare 30 W circular fluorescent lamps. These fluorescent lamps were each lit for 1,000 hours, and then visually observed and evaluated for coloring of glass tube by ultraviolet rays and discoloration or deterioration of the resin constituting the lamp fixture. The results are set forth in Table 4 below.

TABLE 4

|  | Example | | | Comparative Example | | |
| --- | --- | --- | --- | --- | --- | --- |
|  | No. 2 | No. 7 | No. 8 | No. 9 | No. 11 | No. 12 |
| Coloring of glass tube | None | None | None | None | Yellowing | None |
| Discoloration/ deterioration of resin | None | None | None | Discoloration | None | Deterioration |

As is apparent from the above results, Sample Nos. 2, 7 and 8 showed no change in the glass tube and the resin constituting the lamp fixture even after 1,000 hours of lighting, while Sample Nos. 9, 11 and 12, which are comparative examples, showed coloring, discoloration and deterioration.

While the invention has been described in detail and with reference to specific embodiments thereof, it will be apparent to one skilled in the art that various changes and modifications can be made therein without departing from the spirit and scope thereof.

This application is based on Japanese Patent application No. 2000-326564 filed on Oct. 26, 2000, the entire contents of which are incorporated hereinto by reference.

What is claimed is:

1. A glass tube for a fluorescent lamp, comprising glass, said glass compnsing:

$CeO_2$ in an amount of from 0.1% to 1.0% by mass;
   $Sb_2O_3$ in an amount of 0.05% or lower by mass;
   SiO2 in an amount of from 60% to 75% by mass;
   $Al_2O_3$ in an amount of from 0.5% to 10% by mass;
   $B_2O_3$ in an amount of from 0% to 5% by mass;
   CaO in an amount of from 1.9% to 8% by mass;
   MgO in an amount of from 0% to 8% by mass:
   SrO in an amount of from 3.1% to 15% by mass;
   BaO in an amount of from 1% to 12% by mass;
   $R_{2O}$ in an amount of from 13.7% to 22% by mass, wherein R represents Li, Na and K, provided that $Na_2O$ is present in an amount of from 3% to 15% by mass;
   $Fe_2O_3$ in an amount of from 0% to 0.2% by mass;
   $TiO_2$ in an amount of from 0% to 1.0% by mass; and
   PbO in an amount of 0.05% or lower by mass.

2. The glass tube according to claim 1, which is free of $Sb_2O_3$.

3. The glass tube according to claim 1, which is free of PbO.

4. A fluorescent lamp comprising as an envelope a glass tube, said glass tube comprising:

$CeO_2$ in an amount of from 0.1% to 1.0% by mass;
   $Sb_2O_3$ in an amount of 0.05% or lower by mass;
   $SiO_2$ in an amount of from 60% to 75% by mass;
   $Al_2O_3$ in an amount of from 0.5% to 10% by mass;
   $B_2O_3$ in an amount of from 0% to 5% by mass;
   CaO in an amount of from 1.9% to 8% by mass;
   MgO in an amount of from 0% to 8% by mass:
   SrO in an amount of from 3.1% to 15% by mass;
   BaG in an amount of from 1% to 12% by mass;
   $R_2O$ in an amount of from 13.7% to 22% by mass, wherein R represents Li, Na and K, provided that $Na_2O$ is present in an amount of from 3% to 15% by mass;
   $Fe_2O_3$ in an amount of from 0% to 0.2% by mass;
   $TiO_2$ in an amount of from 0% to 1.0% by mass; and
   PbO in an amount of 0.05% or lower by mass.

5. The fluorescent lamp according to claim 4, which is free of $Sb_2O_3$.

6. The fluorescent lamp according to claim 4, which is free of PbO.

* * * * *